(12) United States Patent
Keiser

(10) Patent No.: US 9,516,164 B1
(45) Date of Patent: Dec. 6, 2016

(54) ADVERTISEMENT-FUNDED CALLING SYSTEM WITH AUDIO AND VIDEO MESSAGES

(75) Inventor: Luke Keiser, Frisco, TX (US)

(73) Assignee: SECURUS TECHNOLOGIES, INC., Dallas, TX (US)

( * ) Notice: Subject to any disclaimer, the term of this patent is extended or adjusted under 35 U.S.C. 154(b) by 1470 days.

(21) Appl. No.: 12/981,489

(22) Filed: Dec. 30, 2010

(51) Int. Cl.
*H04M 15/00* (2006.01)
*H04M 3/487* (2006.01)

(52) U.S. Cl.
CPC .................. *H04M 3/4878* (2013.01)

(58) Field of Classification Search
USPC ............... 379/114.1–114.13, 114.03, 114.28, 379/115.01, 121.02, 36
See application file for complete search history.

(56) References Cited

U.S. PATENT DOCUMENTS

| | | | |
|---|---|---|---|
| 6,493,437 B1* | 12/2002 | Olshansky | 379/114.13 |
| 6,947,531 B1* | 9/2005 | Lewis et al. | 379/114.13 |
| 7,158,621 B2 | 1/2007 | Bayne | |
| 8,112,312 B2* | 2/2012 | Ritter | 705/14.72 |
| 2003/0198325 A1* | 10/2003 | Bayne | 379/114.21 |
| 2005/0074102 A1* | 4/2005 | Altberg et al. | 379/114.1 |
| 2005/0261009 A1* | 11/2005 | Hertzberg et al. | 455/466 |
| 2006/0229065 A1* | 10/2006 | Lazaridis et al. | 455/414.3 |
| 2007/0005433 A1* | 1/2007 | Lee et al. | 705/14 |
| 2007/0198443 A1* | 8/2007 | Chernev et al. | 705/500 |
| 2010/0080371 A1* | 4/2010 | Gupta et al. | 379/114.13 |
| 2012/0035993 A1* | 2/2012 | Nangia | 705/14.4 |

* cited by examiner

*Primary Examiner* — Yosef K Laekemariam
(74) *Attorney, Agent, or Firm* — Fogarty, L.L.C.

(57) ABSTRACT

Embodiments of the invention provide a system and method for providing advertisements to the parties of a communication, such as a telephone call or a video conference. A calling party agrees to view or listen to an advertisement in exchange for communications services, such as a telephone call. A called party may also agree to view or listen to an advertisement in order to receive a call. After an advertisement is broadcast to the calling and/or calling parties, a call connection is completed between the parties. Alternatively, audio and/or video advertisements may be broadcast during a call connection.

16 Claims, 2 Drawing Sheets

ADVERTISEMENT-FUNDED CALLING SYSTEM WITH AUDIO AND VIDEO MESSAGES

TECHNICAL FIELD

Embodiments of the invention are directed, in general, to providing subsidized inmate calling services in a correctional system and, more specifically, to methods for providing calling services at a lower cost by using advertisement revenue to offset costs.

BACKGROUND

Telephone service providers typically charge either the caller or a called party for any calls made on the service provider's network. If the caller does not have an established account with the service provider, he or she may be able to pay for the call using a prepaid account or credit card. When the caller does not have a service provider account, a prepaid account, or a credit card, then the caller is usually not allowed to make a call. Any call that is initiated but not completed is lost revenue to the service provider.

This situation may arise in a law enforcement context when an arrestee, prisoner, or other detainee, who is being held in a holding cell, jail, prison or other law enforcement facility, does not have a trustee account, calling account, prepaid account or other means by which to pay for telephone calls. The detainee is then unable to initiate calls, but usually desires to make telephone calls. This results in lost revenue for the law enforcement facility. Depending upon the nature of the law enforcement facility, the detainee may be offered free calls. For example, a recent arrestee may be able to make free telephone calls to try to secure legal representation or bail. These free calls also represent lost revenue to the law enforcement facility and or telecommunication vendor.

SUMMARY

Embodiments of the invention are directed to providing communications services, such as telephone calls or video communications, which are funded by advertisers. Instead of charging the caller or called party, advertising revenue may be used to pay for the call or reduce the cost of the call. When a caller initiates a call, a call processing system collects identifying information, such as the caller's identification and the called party's telephone number. If the collected information is associated with a calling account, then the call is connected in a normal manner and the calling account may be charged for the cost of the call. Alternatively, the advertising system may be utilized even if the collected information is associated with a calling account. If it has been determined that the called party wishes to be connected to the caller through positive call acceptance, and no calling account is available, then the caller is connected after viewing or listening to an advertisement in order to complete the call.

If the system determines that the caller will be receiving the advertisement, then the call processing system selects an advertisement to be played. The advertisement may be selected randomly, or based upon the caller's location, demographics, or other parameters. The advertisement is played for the caller. At the end of the advertisement, the caller is connected to a called party. The duration of the call connection to the called party may be limited and/or may be dependent upon a number or frequency of advertisements viewed or listened to by the caller. The caller may be offered the opportunity to view or listen to additional advertisements during the call in order to keep the call connection active.

The called party may also be offered the opportunity to listen to an advertisement in order to receive an inbound call from the caller. The caller and the called party may receive the same advertisements or different advertisements. The advertisement for the called party may be selected using the same or different criteria used for selecting caller advertisements.

The advertisement may be presented to the caller and/or called party as an audible message played over a telephone system. Alternatively, the advertisement may be a video presentation on a video communication. In another embodiment, the caller and/or called party on a video conference may be shown advertisements for the duration of the call connection. The advertisements may be presented in a designated area of a video display, or they may be inserted into the video in place of the original background. In this case, the viewing party would see the other party, but the original background behind the other party would be replaced with an advertisement.

BRIEF DESCRIPTION OF THE DRAWINGS

Figure 1:
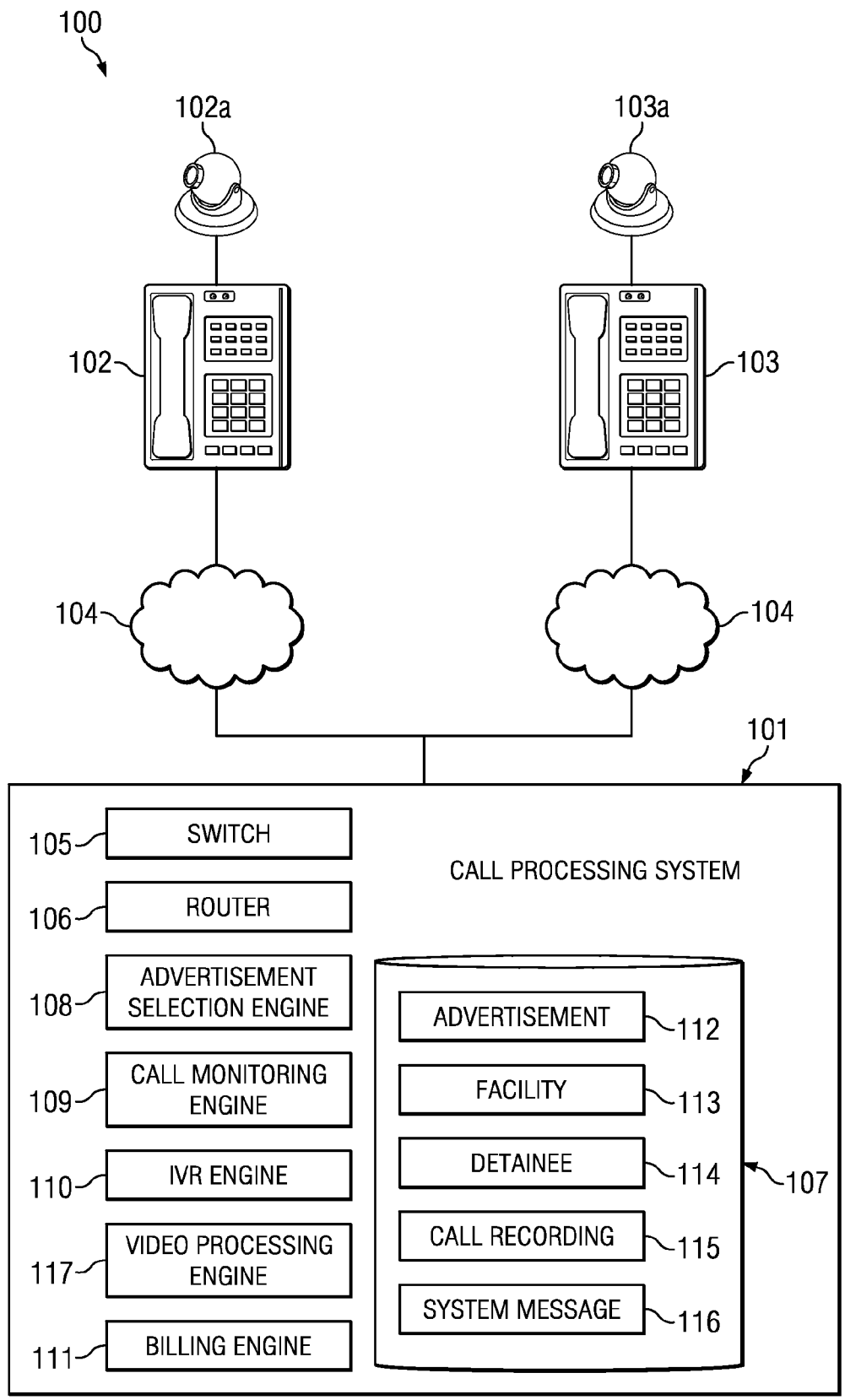
Figure 2:
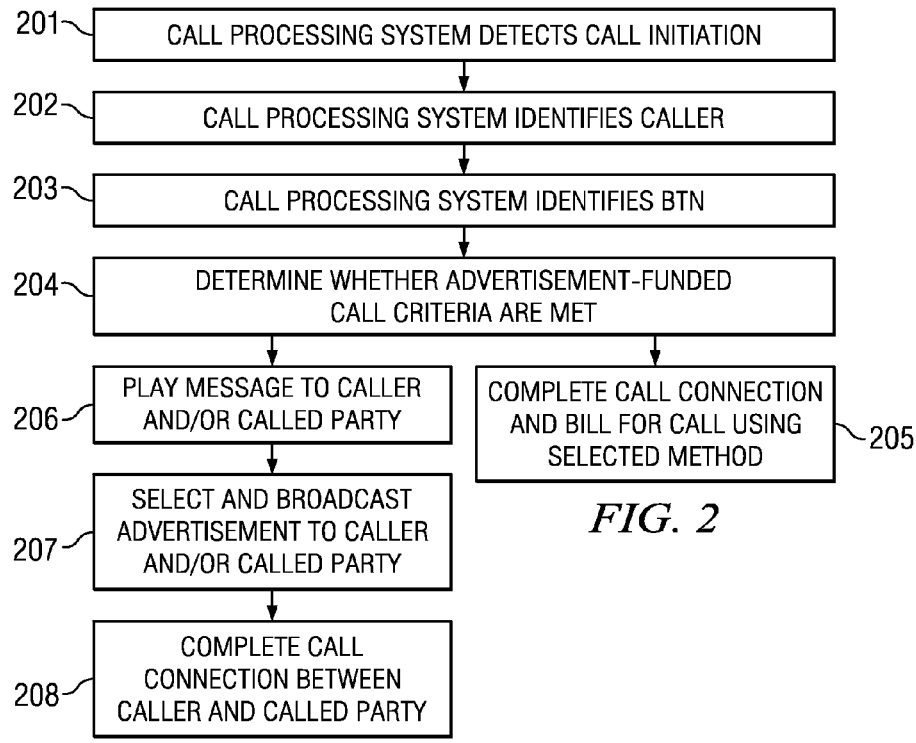
Figure 3:
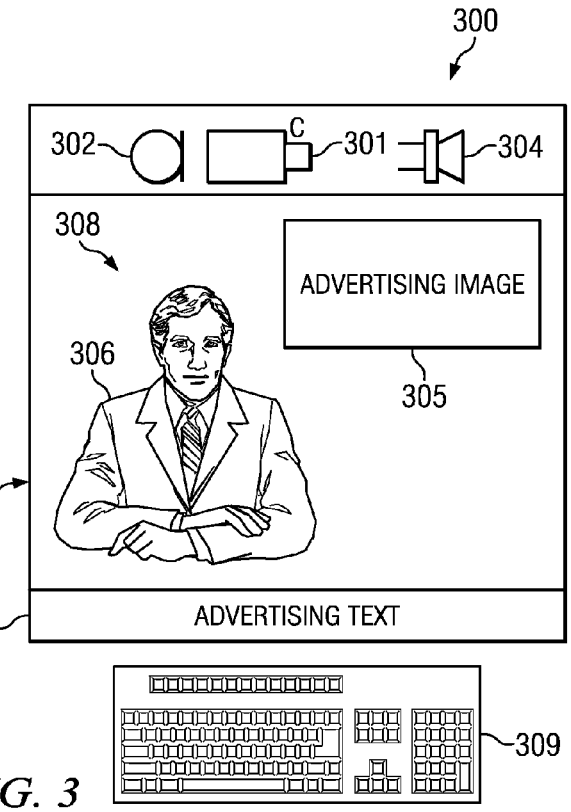

Having thus described the invention in general terms, reference will now be made to the accompanying drawings, which are not necessarily drawn to scale, and wherein:

FIG. 1 is a block diagram of an exemplary embodiment of a telecommunications system;

FIG. 2 is a flow diagram illustrating use of an advertisement-funded calling system according to one embodiment; and FIG. 3 illustrates an exemplary device 300 for conducting a video call while displaying advertisements to the caller or called party.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIG. 1 is a block diagram of an exemplary embodiment of a telecommunications system 100 for providing detainee communications services.

Telecommunication system 100 comprises a call processing system 101, which may include, for example, switching or routing equipment to support circuit-switched or packet-based communication connections. Call processing system 101 supports analog and/or digital communications, such as Plain Old Telephone Service (POTS), Voice over IP (VoIP), video communication, email, or any other communication format. One or more custodial telephones 102 are supported by call processing system 101. In one embodiment, custodial telephones 102 are located in a controlled environment facility, such as a jail, prison, holding cell, or hospital. Call processing system 101 provides communication services between custodial telephone 102 and one or more remote telephones 103, which may be, for example, telephones located at a residence, business, or government or public facility located separately from the controlled environment facility and/or custodial telephone 102.

Call processing system 101 and custodial telephone 102 may be provided by the same service provider. Alternatively, call processing system 101 may provide communication services to one or more subscribers' custodial telephones 102. Call processing system 101 may be co-located with custodial telephones 102 or located remotely from custodial telephones 102. A service provider's custodial telephones 102 may be deployed at one or more locations or facilities. Call processing system 101 may communicate with custodial telephones 102 and/or remote telephones 103 via any public or private communications network 104, such as a public switched telephone network (PSTN), a packet-based communication network, such as the Internet, a local area network (LAN), a metropolitan area network (MAN), a wide area network (WAN), or any other communications network, including a wireless network, a cable transmission system, a satellite transmission system, and/or the like.

The custodial telephone 102 and the remote telephone 103 may be embodied as any communication device and are not limited to traditional telephones. For example, although the word "telephone" is used herein, telephones 102 and 103 will be understood to include any communication device, including, without limitation, a Touch-Tone or rotary telephone, cellular or mobile telephone, personal digital assistant (PDA), pager, personal or laptop computer running, for example, an email or VoIP software application, and the like. In other embodiments, the custodial telephone 102 and the remote telephone 103 may be equipped with the capability to facilitate video communications, such as the any of the above mentioned communication devices equipped with a video camera 102a, 103a. Alternatively, telephones 102 and/or 103 may be embodied as a kiosk that supports video communications.

Call processing system 101 comprises a processor-driven device or devices, such as a switch 105 and/or router 106, configured to receive and process telephone calls. To process the telephone calls and provide the services described herein, call processing system 101 stores data and software programs or modules in a memory 107 that may be logically or physically divided. The data and program modules include, for example, advertisement selection engine 108, call monitoring engine 109, interactive communication engine 110, and billing engine 111. Additionally, call processing system 101 may also comprise or be in communication with one or more databases, memories, or data storage devices. For example, call processing system 101 communicates with or comprises advertisement database 112, custodial facility database 113, detainee database 114, recorded call database 115, and system messages database 116.

In one embodiment, custodial telephone 102 is located in a law enforcement facility, such as a prison, jail, or holding cell. Prisoners, inmates, arrestees, or other detainees at the law enforcement facility may use custodial telephone 102 to communicate with family, friends, attorneys, bail bondsmen, or other parties. The law enforcement facility may charge for the use of custodial telephone 102. However, a detainee may be unable to pay to use custodial telephone 102, if the detainee does not have a commissary or trust account established with the law enforcement facility. This may occur, for example, if the detainee has recently arrived at the facility or is a temporary resident of the facility. In some facilities, custodial telephones may be provided to detainees who wish to make collect or prepaid calls that are billed to some other entity. However, due to the costs and/or risks involved with collecting payment from such calls, some facilities may not offer such payment options. Alternatively, the law enforcement facility may desire to provide telephone services to detainees without charge, but still needs to offset the costs incurred in providing such telephone services.

In such cases, call processing system 101 and custodial telephone 102 may allow inmates to call third parties, such as friends and family, attorneys, or others, without charge. Instead of charging an account or called party to cover the cost of a call, call processing system 101 may use advertising revenue to pay for or reduce the cost of the calls on custodial telephone 102. For example, the detainee and/or the called party may be required to hear or view one or more advertisements before a desired call will be connected to the called party. After one or more advertisements are played, the desired call connection is completed and the detainee and the called party may communicate. Custodial facility database 113 stores, for example, the number, location and other pertinent information associated with each custodial phone in the system. Custodial facility database 113 may include information indicating which detainees are allowed to use the advertisement-funded calls and/or which custodial telephones 103 can be used to provide advertisement-funded calling services.

Call processing system 101 may limit the duration of each advertising-funded call for any predetermined duration. The detainee may be limited to calls lasting, for example, ninety seconds if the call was advertiser funded. The detainee and/or called party may be required to view or hear a new advertisement to continue the call for an additional length of time. In other embodiments, the detainee may be allowed to make only one or a limited number of such advertising-funded calls. Alternatively, call processing system 101 may allow the detainee to make as many such calls as desired. Typically, a new advertisement would be played prior to each new call connection for the detainee.

In one embodiment, the detainee lifts the receiver on custodial telephone 102 and initiates a call to a called party. Call processing system 101 detects the call attempt and either plays one or more advertisements to the detainee before initiating the requested call connection, or initiates the call connection to the called party before playing advertising messages. If both the detainee and the called party are connected to the call processing system 101, direct communication between them may be withheld until the advertisements are played.

Call processing system 101 identifies the detainee and called party. The identification may be based, for example, on the detainee's location, a detainee identifier, the called party's telephone number, or an identifier for custodial telephone 102. Call processing system 101 uses advertisement selection engine 108 to determine which advertisements to play. Based upon the detainee and/or called party's identification, or based upon any other criteria, including random selection, advertisement selection engine 108 selects an advertisement from advertisement database 112, which stores audio and/or video advertising messages and characteristics. Advertisement database 112 may further store data associated with each advertising message, such as an advertisement duration, an intended audience, a required or maximum number of plays, and a counter of how many times each advertising message is played.

Call processing system 101 uses communication engine 110 to interact with the detainee and/or called party by playing system messages and recognizing the detainee and/or called party's responses. For example, upon detection that a new call has been initiated, communication engine 110 may select a welcome or introduction message from system message database 116. The communication engine 110 plays the welcome message to the detainee and/or called party to notify them that an advertisement must be played before the call connection will be completed. The communication engine 110 may also be used to play or provide the selected advertisements to the detainee and called party. In certain embodiments, the communication engine 110 may be replaced by an interactive voice response (IVR) engine, Voice Response Unit (VRU) engine, or another similar system.

After the advertisement has been played, call processing system 101 completes a call connection between the detainee and called party. Call processing system 101 may allow the call connection to continue for a predetermined duration, or for any duration. The predetermined duration may be selected based upon the particular advertisement played or the number of advertisements played. Alternatively, all advertisement-funded call connections may be limited to the same duration.

Call processing system 101 may use call monitoring engine 109 to record some or all calls. Call recordings and call-related data may be stored to recorded call database 115. Call monitoring engine 109 monitors calls for improper content, such as gang signs, pornography, sexual content, and criminal activity. Once improper content is detected, call monitoring engine 109 notifies call processing system 101, which may disconnect the call, and/or alert a monitoring agent or authority. When the call is disconnected, call processing system 101 may use Interactive communication engine 110 to inform the inmate of the content violation. Call processing system 101 may also document revocation of the detainee's privileges by recording the violation in the detainee's record or file in detainee database 114. An inmate is advised of the system's flexible one-strike rule on improper content when the inmate is provided with the inmate's identification number and PIN. By using the system, the inmate agrees to the monitoring and also to comply with the content restrictions. When the inmate violates the one-strike rule, the system is flexible in how the inmate's access to the system will be limited. For example, the first violation may result in a warning from the interactive communication engine 110, a one-day suspension from use of the telecommunication system, or a complete revocation of telecommunication privileges. While the system is flexible in how the inmate is disciplined for violations of the improper content rule, the system strictly enforces the improper content rule. In some embodiments, the call monitoring engine 109 will also send the suspected call to prison officials for review. Upon review, the prison official may reinstate the inmate's privileges by overwriting the violation in the detainee database 114. Detainee database 114 stores detainee files, such as identification information for each inmate, assigned PIN, phone privileges, criminal record, and other similar information.

Although an exemplary embodiment described herein is deployed in a law enforcement environment to provide calling services to detainees, those of ordinary skill in the art will understand that the systems and methods described and claimed herein may be used in other facilities and locations to provide communications services to other groups or individuals. For example, an advertisement-funded calling system may be deployed in a hospital or medical facility to allow patients or visitors to make calls. An advertisement-funded calling system may also be provided on a temporary or permanent military base, installation or ship to allow military personnel to make calls. The advertisement-funded calling system would also be useful in other environments in which individuals' movements are restricted or prohibited and in which they may not have funds to pay for calling services.

Additionally, although an exemplary embodiment described herein refer to telephone calling services, it will be understood by those of skill in the art that any communication services may be supported by such advertising-funded system. For example, a detainee may be required to view or hear an advertisement before access is provided to an email application, text application, or a video communication system. The advertisement-funded calling system is not limited to two-person calls, but can also be applied to multi-party calls in which one or more of the parties to the multi-person call view or hear advertisements.

In another embodiment, the call processing system detects when a communication link is initiated between a first party and a second party. Instead of determining whether a billing account applies to the communication, the call processing system applies a set of advertising rules to the first party and/or second party. The call processing system determines, based on the advertising rules, whether to play one or more advertisements to the first party and/or the second party. The advertisement selection engine and/or billing engine may apply the advertising rules, for example. The call processing system then connects the communication link between the parties after playing advertisements to the selected parties.

FIG. 2 is a flow diagram illustrating use of an advertisement-funded calling system according to one embodiment. At step 201, the call processing system detects the initiation of a call, such as when a detainee lifts a receiver on a custodial telephone. At step 202, in some embodiments, the call processing system identifies the caller; however, caller identification may not be required. A detainee may input an identification number and identification verifier, such as a PIN, radio frequency identification (RFID), biometric identifier, or other similar means of verifying the inmate's identity, or the call processing system may identify the caller by the particular custodial telephone used or the particular facility from which the call initiates. The caller's identification may be used to select advertisements to be played or whether the caller is authorized to use the system. Using the inmate's identification number and identification verifier, the system checks the inmate's privileges in detainee database 116.

In step 203, the call processing system collects the telephone number of the called party or the Billed to Number (BTN). In step 204, the call processing system determines whether the caller and/or the called party meet the criteria for an advertisement-funded call. For example, if the caller does not have privileges to use the system or has already used the system a predetermined number of times, then the call processing system disconnects the call. The system may play a message to the caller that identifies a reason for termination of the call. Alternatively, using billing engine 111, the call processing system may determine whether the call is billable, such as if the caller, called party, or BTN are associated with an established calling account that is funded to pay for calls.

If the caller and/or the called number is not approved for the advertising-funded call, then the process continues at step 205 and the call connection is completed and the call is billed according to a method selected by the inmate, such as a prepaid account, calling account, or collect call charge. Alternatively, the call may be terminated without completion if the caller or called party is not authorized to use the advertising-funded call system and has no other means of payment.

If the caller is approved to make calls using the advertising-funded call system, then the process continues at step 206. A message is played to the caller and/or the called party in step 206. The message may inform them that they must listen to or watch an advertisement before the call will be completed. The message may identify any call limitations, such as call duration limits, or provide warnings, such as a call-monitoring or call-recording notice. Messages may be played to the caller and called party using an interactive communication system, for example.

In step 207, the system selects an advertisement to play to the caller and/or called party using, for example, an advertisement selection engine. The advertisement selection engine may select the advertisement from an advertisement database. This may be a random selection, or some pre-defined selection criteria may be employed. The pre-defined selection criteria may compare the caller or called party identity, location or other characteristics to select advertisements. The system may compare characteristics associated with each advertisement and stored in the advertisement database with characteristics of the caller and called party to select which advertisement to broadcast. As an example, the advertiser may indicate certain key characteristics of the advertisement, such as business type, geographic location, or intended audience. These characteristics may be used as a filter for the advertisement selection engine. The advertisement selection engine uses information associated with the called party's number, the caller identification number, and the custodial phone location in selecting which advertisement message to play. For example, if the caller initiates the call from a telephone in a jail booking area, the system will search for advertisements for attorneys, bail bondsmen, and similar services in the local area. The relationship between the parties may also be used to select advertisements. For example, if the caller makes a call from Dallas, Tex. to a called party in Los Angeles, Calif., then the system may search for local or national advertisements for consumer goods, calling cards, or other products and services that either the caller or the called party could purchase. The caller and called party may hear or view the same advertisement or different advertisements.

In certain embodiments, the advertisements may also be categorized based on the advertiser's payment level. Advertisers pay a fixed fee to attain certain advertisement levels, which would guarantee that the advertisement plays a certain number of times. In other embodiments, the advertisers may pay for the advertisement based on the time of day that the system plays the advertisement. The advertisement database or advertisement selection engine tracks the number of times each advertisement is played. Advertisement selection engine may be responsible for ensuring that each advertisement using this payment plan is played the correct number of times or at the proper time of day.

After the advertisement is selected, the system plays the advertisement to the inmate. Once the advertisement finishes playing, the call processing system alerts the caller that the call is now being connected. The call processing system then completes the call connection between the parties in step 208.

The call processing system may or may not play advertisements to the called party. In one embodiment, the system connects to the called party in step 206 and notifies them that to receive an incoming call, they must listen to or view an advertisement. If the called party agrees, then the process continues. If the called party does not want to listen to the advertisement or receive the call, then the call is terminated. Alternatively, the system may complete steps 201-207 just for the caller. When the caller has heard or viewed the advertisement in step 207, then the call processing system may route the call to the called party to complete the connection in step 208. In this embodiment, the called party does not interact with the call processing system or the advertisement selection.

After the call connection is completed in step 208, the call may be monitored and/or recorded. In certain embodiments, the system plays more than one advertisement to the parties. The system may be set to play multiple advertisements or the parties may choose to increase call time by choosing to listen to multiple advertisements. The caller may make this selection either before the call is connected or once the call time is expiring.

It will be understood that the term advertisement as used herein is not intended to be limited to a commercial advertisement prepared on behalf of a business organization, but includes any news, information, message, solicitation, jingle, song, lesson, prayer, public service announcement, educational program, or other information that may or may not be promoting a particular product, service, individual, organization, opinion, or philosophy.

In other embodiments, the caller and/or called party advertisement may be a survey or other interactive activity in which the caller and/or called party are requested to answer questions, give opinions, or provide some other active response.

In certain embodiments, the advertisers pay for the advertisement based on the number of times the system has played the advertisement over a predetermined period. The advertisement database may track the number of times each advertisement is played over a billing period, for example. At the end of each billing cycle, the billing engine bills the advertiser based on the number of times the advertisement is played in that billing period. Alternatively, the advertiser may pay a certain fee to have the advertisement played a certain number of times during the billing period. An advertisement selection engine may then track the number of times the advertisement is broadcast and may select messages for broadcast based upon an available number of plays remaining in the billing period. For example, an advertisement that has been played a relatively fewer number of time compared to other advertisements in the database may be weighted so that it is more likely to be selected for broadcast.

In other embodiments, the call connection can be completed immediately after the caller and/or calling party indicate acceptance of advertisements. The advertisement may then be sent by a separate communication channel to the party. For example, the called party number may correspond to a wireless device or cellular telephone. The call processing system may inform the called party that a call has been initiated and that to accept the call, the called party must receive an advertisement. Instead of viewing or listening to an advertisement, the call connection is completed and the advertisement may be sent to the called party as a text message or email. Similarly, the calling party may agree to receive such advertisements to initiate a call. The caller or called party may elect to receive one or more advertisements via email, text, short message service (SMS) message, multimedia message service (MMS), facsimile, courier, postal mail, or by any other communication media. The party may be required to respond to the advertisement in order to confirm that the proper alternative communication channel was identified. For example, if the called party agrees to receive a text message in order to accept an inbound call, the call processing system may require that the called party respond to the text message to continue the call. This would prevent the party from giving a false or unused address for the advertisement. This would allow the advertiser to send coupons, discounts, or other material to the parties in addition to promotional audio or video information.

In another embodiment, the advertisement may be played during the communication between the parties. Background audio, such as a message, song or jingle, may be played while the caller and called party are talking Referring again to FIG. 1, after selecting an advertisement, call processing system 101 may connect the interactive communication engine 110 into an established call connection between the parties effectively creating a three-way call. The interactive communication engine 110 plays the selected advertisement for all or part of the call connection duration.

In another embodiment, the advertisement may be played in the background during a video call. FIG. 3 illustrates an exemplary device 300 for conducting a video call while displaying advertisements to the caller or called party. Although described from the perspective of the caller, device 300 would operate in a similar manner for the called party or any other party to a multi-party call. Camera 301 captures moving or still video images of the caller and microphone 302 captures audio from the caller. The images and audio are transmitted to the called party. The called party may use a similar device that transmits images and audio from the called party to the caller. Received images of the called party are displayed on screen 303 and called party audio is played through speaker 304. The caller can enter dialed digits or other information to the call processing system via user interface 309.

A call connection between the parties may be established as described above. Either or both of the parties may be asked to receive an advertisement in order for the video call to continue. However, instead of playing the advertisement before completing the call connection, the parties are connected and one or more advertisements are broadcast to either or both parties during all or part of the call. Advertising images, such as logos, video, still pictures, or graphics, are displayed in a designated image area 305. For example, the image of the called party 306 may be offset up/down or left/right on display 303 to make room for image area 305. Image area 305 may include text.

An additional or alternative text area 307 may be displayed on screen 303. Text area 307 may be a scrolling or still text message containing the selected advertisement. In some embodiments, both image area 305 and text area 307 are displayed during a call. Each area may display advertisements that are related, unrelated, coordinated, or uncoordinated, such that the advertisements in image area 305 and text area 307 may be part of the same advertising campaign or from different campaigns. More than one image area and text area may be used simultaneously during the call. The location of the image area and text area may also change during the call or from call to call. The advertiser may select how and where the advertisement should be displayed, or how the advertisement should move during a call. If the advertisement is moving, such as an image area 305 that hops or slide around the screen, then the viewing party will be more likely to notice and watch the advertisement. A video processing engine 117 (FIG. 1) in call processing system 101 may be used to add image area 305 and text area 307 to the displayed video.

In another embodiment, screen 303 may display an image 306 of the opposite party, but the remainder of the screen area 308 is used for an advertisement. This would allow the advertisement to be played in the background 308 of the called party 306. Chroma key compositing or chroma keying may be used to insert advertisements in the image behind the called party. The called party may be placed in front of a greenscreen or bluescreen. During the call, the green or blue color is replaced in the video image with an advertisement by video processing engine 117. Alternatively, the called party is not located in front of a special background, but video processing engine 117 analyzes the video image from the called party and identifies the portion of the image that corresponds to the called party, such as by observing movement of the called party and lack of movement of the background during the call. The video processing system may treat any video that is not part of the called party image as background and may insert advertisements by replacing the background area.

In one embodiment, the video conference interface 300 is used for visitation in a law enforcement environment. One party may be a detainee in a restricted access facility, such as a prison, and the other party is a friend, family member, bail bondman or attorney at some location separated from the detainee. The detainee or the other party may schedule a video visitation session. The detainee would participate in the call using a video conference interface 300 at the prison, and the other party would use a similar device in a separate area of the prison, or at a location remote from the prison. Alternatively, the detainee and/or other person may use a personal or laptop computer with a web camera to participate in the call. The video connection between the parties maybe established and supported by an organization, organizations or commercial service that provides computer services and software for use in telecommunications industry.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A call processing system configured to provide a call connection service between an originating telephone and a destination telephone, wherein at least one of the originating telephone or the destination telephone is located within a controlled-environment facility, the call processing system comprising:

a billing engine adapted to identify a billing account for at least one of: the originating telephone, the destination telephone, a calling party, or a called party; and an advertising interface adapted to broadcast one or more advertisements to the originating telephone, wherein, in response to the billing account not having been identified by the billing engine, the call processing system is configured to not initiate a call connection between the originating telephone and the destination telephone unless the one or more advertisements have been broadcast, and wherein the one or more advertisements are selected based upon a location of the originating telephone within the controlled-environment facility.

2. The call processing system of claim 1, wherein the advertising interface is adapted to broadcast one or more advertisements to the destination telephone.

3. The call processing system of claim 2, wherein different advertisements are broadcast to the originating telephone and the destination telephone.

4. The call processing system of claim 1, wherein the location is a booking area, and wherein the one or more advertisements are for at least one of: an attorney or a bail bondsman.

5. The call processing system of claim 1, wherein the call connection is a video conference and the one or more advertisements are in a video format, the call processing system further configured to broadcast the one or more advertisements to the originating telephone or the destination telephone or both.

6. The call processing system of claim 5, wherein the call processing system is configured to replace a background behind the called party in an image of the video conference with the one or more advertisements.

7. A method, comprising: determining that a video conference has been requested between a first party and a second party, wherein the first party is a resident of a controlled-environment facility;
selecting, based upon a location of the first party within the controlled-environment facility or based upon a location of the second party, one or more video advertisements to be played to at least one of: the first party, or the second party;
broadcasting the one or more video advertisements during the video conference to at least partially fund the video conference, the one of more video advertisements appearing in place of at least a portion of a background on a display using chroma key compositing; and
allowing the video conference after the one or more video advertisements have been broadcast or while the one or more video advertisements are being broadcast.

8. A method for providing a video communication between a first party and a second party, comprising:
detecting that the video communication is requested;
determining that a billing account has not been identified to pay for the video communication;
broadcasting one or more advertisements to one or more of the parties, wherein the one or more advertisements are selected based upon a location of the first or second parties within the controlled-environment facility; and
enabling the video communication only after the advertisement has been broadcast or while the advertisement is being broadcast.

9. The method of claim 8, wherein the video advertisement appears in place of at least a portion of the background on a display using chroma key compositing.

10. The method of claim 8, wherein the location is a booking area, and wherein the one or more advertisements are for at least one of: an attorney or a bail bondsman.

11. The method of claim 8, wherein the one or more advertisements are broadcast as a text message or email.

12. The method of claim 8, wherein the one or more advertisements are broadcast via facsimile, courier, or postal mail.

13. The method of claim 7, wherein the location is a booking area, and wherein the one or more video advertisements are for at least one of: an attorney or a bail bondsman.

14. The method of claim 7, wherein the one or more video advertisements are broadcast via a channel separate from that of the video conference.

15. The method of claim 14, wherein the one or more video advertisements are broadcast as a text message.

16. The method of claim 14, wherein the one or more video advertisements are also broadcast as an email.

* * * * *

UNITED STATES PATENT AND TRADEMARK OFFICE
CERTIFICATE OF CORRECTION

Page 1 of 1

PATENT NO. : 9,516,164 B1
APPLICATION NO. : 12/981489
DATED : December 6, 2016
INVENTOR(S) : Luke Keiser It is certified that error appears in the above-identified patent and that said Letters Patent is hereby corrected as shown below:

In the Claims

In Column 11, Line 31, Claim 7, delete "one of more" and insert -- one or more --, therefor.

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*